United States Patent [19]

Scherber et al.

[11] 4,235,226

[45] Nov. 25, 1980

[54] COLLECTOR PANEL FOR SOLAR ENERGY

[75] Inventors: Werner Scherber, Salem; Günther Dietrich, Daisendorf, both of Fed. Rep. of Germany

[73] Assignee: Dornier System GmbH, Friedrichshafen, Fed. Rep. of Germany

[21] Appl. No.: 873,472

[22] Filed: Jan. 30, 1978

Related U.S. Application Data

[63] Continuation-in-part of Ser. No. 786,443, Apr. 8, 1977, Pat. No. 4,148,294.

[30] Foreign Application Priority Data

Apr. 15, 1976 [DE] Fed. Rep. of Germany ....... 2616662
Feb. 9, 1977 [DE] Fed. Rep. of Germany ....... 2705337
Dec. 16, 1977 [DE] Fed. Rep. of Germany ....... 2756142

[51] Int. Cl.³ ............................................. F24J 3/02
[52] U.S. Cl. ................................. 126/449; 126/417; 126/901; 428/92
[58] Field of Search ............... 126/270, 271, 901, 417, 126/449; 73/355 R; 136/89PC, 206; 156/612, 613, 614; 428/97, 913, 95, 92; 427/252, 253, 160

[56] References Cited

U.S. PATENT DOCUMENTS

| 4,005,698 | 2/1977 | Cuomo et al. | 126/270 |
| 4,065,592 | 12/1977 | McAllister | 428/97 |
| 4,065,593 | 12/1977 | Peterson | 428/92 |
| 4,117,829 | 10/1978 | Gross et al. | 126/270 |

FOREIGN PATENT DOCUMENTS 51-3333 7/1976 Japan .

*Primary Examiner*—James C. Yeung
*Assistant Examiner*—Larry Jones
*Attorney, Agent, or Firm*—Toren, McGeady and Stanger

[57] ABSTRACT

A solar collector panel consisting essentially of an electrically conductive substrate and of galvanically deposited projections which substantially completely cover a face of the substrate and extend away from the face to respective peaks absorb solar radiation efficiently when their peak-to-peak spacing averages 0.1 to 1 μm in a direction parallel to the covered face, and the surfaces of the projections consist essentially of metal. The heat resistance of the projections can be enhanced by providing them with a core of different material, such as refractive metal oxide.

10 Claims, 7 Drawing Figures

COLLECTOR PANEL FOR SOLAR ENERGY

This application is a continuation-in-part of our copending application Ser. No. 786,443, filed on Apr. 8, 1977, now U.S. Pat. No. 4,148,294.

It was proposed in our earlier application to coat an aluminum or aluminum alloy panel with a porous layer of aluminum oxide, by anodizing, and to grow microscopic nickel rods electrolytically on the underlying metal in the pores of the anodized surface layer. The average spacing of the nickel rods projecting through the anodized layer is controlled by the structure of the anodic coating, and the coated panel is most effective in trapping solar energy if the average center-to-center spacing of the pores, and therefore of the nickel rods, is less than 1 $\mu$m.

It has now been found that such coatings consisting essentially of closely juxtaposed minute projections can be formed on conductive substrates other than aluminum, and do not require preliminary anodizing of the metallic substrate if suitable conditions of electrodeposition are maintained. They extend to respective peaks in a direction away from the substrate.

As in the case of the nickel rods of our earlier invention, the peak-to-peak spacing of adjacent projections must be only a small fraction of the wave length of visible solar radiation, at least 90% of the peak-to-peak spacings being smaller than 2 $\mu$m, and the average spacing being between 0.1 and 1 $\mu$m. The projections in the panels of this invention cover the metallic substrate substantially completely, and their surface portions consist essentially or exclusively of metal. Metals that can be deposited readily to form the projections include, but are not limited to silver, antimony, zinc, lead, cadmium, bismuth, tin, nickel, cobalt, and iron, and will generally be chosen to withstand the corrosive properties of the ambient atmosphere and other service conditions. Considerations of structural strength as well as corrosion resistance and thermal conductivity control the choice of the substrate which may typically include a layer of steel, aluminum, or copper, further protected by a coating of zinc, nickel, chromium, and the like in a conventional manner if needed.

The dimensions of the individual projections, and thereby their spacing, can be controlled with particular ease by codepositing materials other than the metal of the projections. While at least the surface portions of the projections are deposited galvanically from an electrolyte in which they are present in the form of ions, the codeposited material is dispersed in the electrolyte without carrying an electric charge and may consist of conductive metal, but also of non-conductive compounds. The resistance of a solar collector panel of this invention to high operating temperatures may be enhanced significantly by providing at least a major portion of the projections with cores of aluminum oxide, silicon oxide, cerium oxide, or similar refractory materials which are covered by the metallic surface material of the projections and separated by the same from the metallic, continuous substrate.

Useful solar collector panels have been prepared with projections which contain cores having a particle size of 10 to 100 nm, that is within the range of colloidal dispersions, each core normally consisting of one such particle.

The solar collector panels of this invention as well as those of our earlier invention have high absorption values for the entire solar spectrum and low emission values independent of the angle of incidence of the solar radiation because they do not rely on a trapping of the incident radiation by multiple reflection between surfaces of adjacent projections. Such a trapping effect, analogous to sound absorption by the walls of an anechoic chamber, requires dimensions of a different order of magnitude in the spacing of individual projections, typically a multiple of the wavelength of the radiation to be absorbed which ranges from 0.2 to 40 $\mu$m. Peak-to-peak spacings averaging 40 to 60 $\mu$m have been proposed heretofore for dendrites of tungsten deposited from a mixture of tungsten fluoride and hydrogen on a substrate to form a solar radiation collector (see Cuomo et al. application Ser. No. 515,780, filed Oct. 18, 1974, and relied upon for priority in the German published application P No. 25 39 101). The known panels reflect a large portion of the solar spectrum at angles of incidence differing from a right angle by as little as 15° or less.

The attached drawing shows coatings produced in a manner more fully described hereinbelow in specific examples. The several drawing Figures are prints of actual photomicrographs obtained by means of a scanning electron microscope and differ in part by the magnification chosen.

The manner in which the several coatings were produced is described in the following examples.

EXAMPLE 1

A steel panel was degreased, pickled in inhibited acid, rinsed, and plated with bright nickel. It was then rinsed carefully and made the cathode at ambient temperature in an aqueous electrolyte containing 30 g/l AgNO$_3$, 80 g/l NaNO$_3$, and 2 ml/l HNO$_3$ (d=1.4) for 1 minute at a current density of approximately 3 amp./dm$^2$.

Figure 1:
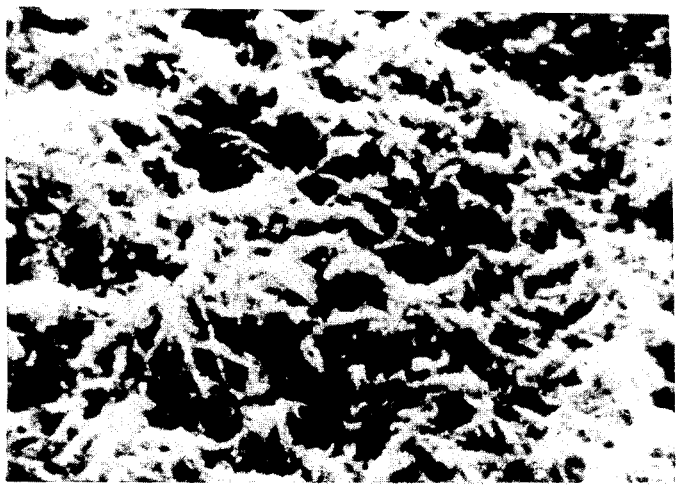
FIG. 1 is a rectangular portion of a micrograph whose sides correspond to 11.6 and 8.1 $\mu$m respectively and shows a silver coating according to the invention.

At the magnification of FIG. 1, the silver deposit appeared to consist of felted filaments spaced no more than a fraction of a micrometer ($\mu$m) from each other. The coated panel was tested for absorptance ($\alpha$) and of emittance ($\epsilon$) by standard methods, and gave $\alpha/\epsilon$ values of 0.85/0.27 for absorbed solar radiation and emitted thermal energy respectively.

Similar elongated projections which may be needle-like or filamentous as the illustrated silver deposit have been prepared from solutions of simple salts of metals characterized by low overvoltage, such as Sb, Zn, Pb, Cd, Bi, and Sn. The necessary electrolytes are characterized by low concentrations of ions of the metal to be deposited and relatively high concentrations of cations not capable of being deposited from aqueous solutions, such as the alkali metal and ammonium ions. Complexing agents of all types must be avoided since they favor leveling of the deposits while growth of the deposit from multiple active sites is desired for the purpose of this invention. Leveling is further suppressed by electrodeposition at medium-high current densities of the order of 10 amperes per square decimeter.

Because of their relatively high reactivity with the components of the atmosphere, the metals referred to in the preceding paragraph are not useful for solar collector panels to be employed on earth, but they may find extraterrestrial applications. Gold and other noble metals are as readily deposited as silver, but are not normally practical because of their cost.

EXAMPLE 2

Figure 2:
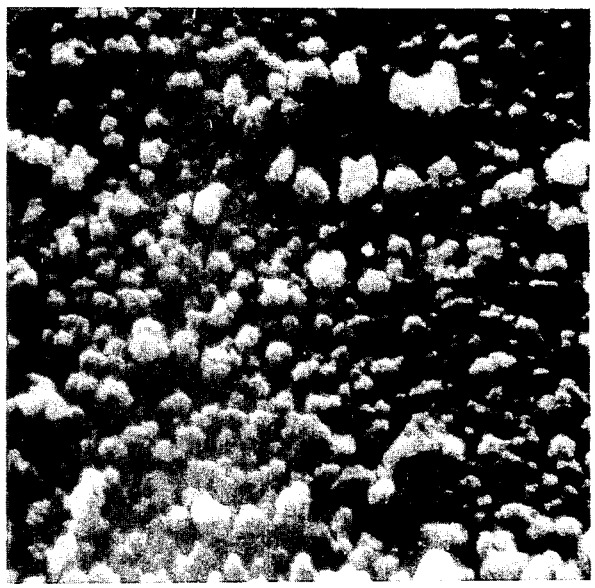
FIG. 2 shows a similar square portion of a nickel coating in a print whose sides correspond to 4.8$\mu$.

A steel panel prepared in the manner described above was electroplated at room temperature in an aqueous electrolyte containing 14 g/l $NiCl_2$, 16 g/l $NH_4Cl$ and 40 g/l NaCl at an applied voltage of 4 V for about 20 seconds. The surface coating so produced at a current density of about 12 amp./dm$^2$ is shown in FIG. 2. The average peak-to-peak spacing of the small nickel projections produced thereby was approximately 0.2 $\mu$m. The $\alpha/\epsilon$ values of the coating were 0.91/0.20. When the coated panel was heated briefly in oxygen at temperatures in excess of 200° C., the $\alpha$ value could be raised to about 0.96.

Nickel is the preferred coating material of this invention at this time because of its low cost and high temperature and corrosion resistance. However, iron and cobalt may be deposited in the same or a similar manner to produce coatings which are not superior to nickel deposits in any respect relevant to the basic aspects of this invention, but provide similar $\alpha/\epsilon$ values. Iron, however, deteriorates rapidly in the presence of oxygen and moisture, and cobalt is more expensive at this time than nickel. The transition metals of the iron group and particularly nickel, are distinguished by relatively high melting points and are thus applicable at working temperatures for which many metals referred to as substitutes for silver in Example 1 are not suitable.

EXAMPLE 3

Figure 3:
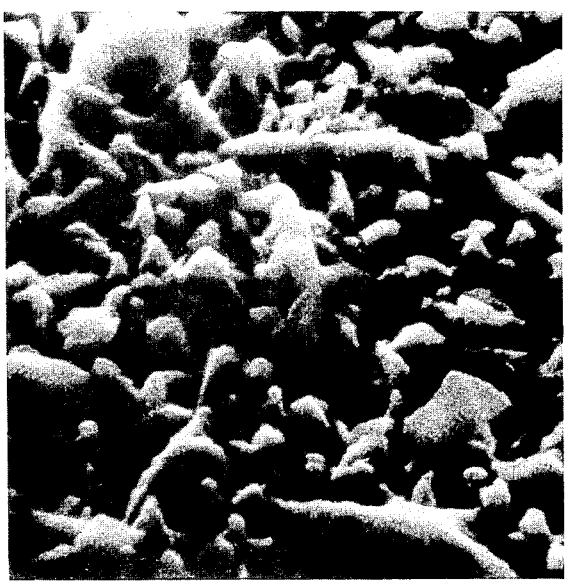
FIG. 3 illustrates a cobalt coating on approximately the same scale as FIG. 2.

The coated panel shown in FIG. 3 was prepared by depositing cobalt on a nickel plated steel panel which was activated immediately prior to cobalt plating by 30 seconds immersion in dilute hydrochloric acid. The aqueous cobalt electrolyte contained, per liter, 500 g $CoSO_4.7H_2O$, 15 g NaCl, and 40 g $H_3BO_3$. A potential of 4 V was applied to the electrodes to produce a current density of about 10 amps./dm$^2$ for 3 minutes at an electrolyte temperature of 40° C.

EXAMPLE 4

Two aluminum panels were etched in dilute aqueous sodium hydroxide solution (50 g/l) and in dilute nitric acid respectively. After etching, the panels were rinsed and briefly exposed to the atmosphere to permit the formation of a thin layer of aluminum oxide. They were then each made the cathode in the electrolyte described in Example 3 at 55° C. for three minutes at a current density of 8 amp./dm$^2$.

Figure 4:
FIG. 4 is a view of a cobalt coating on a scale of 2 $\mu$m per centimeter.
Figure 5:
FIG. 5 illustrates a cobalt coating on a scale of 0.5 $\mu$m per centimeter, substantially equal to the scale of FIGS. 2 and 3.

The cobalt coatings so produced are shown in FIGS. 4 and 5 respectively. Their $\alpha/\epsilon$ values were closely similar to those obtained in Example 2, and could be improved by heating in an oxidizing atmosphere at 200° C. to 0.96/0.20.

The desired surface configuration of the electrodeposited cobalt layer was enhanced by the etching of the aluminum substrate to a roughness of less than 1 $\mu$m RMS, and the subsequent formation of a thin natural oxide film. At the relatively high cathode current density employed, the oxide film was ruptured wherever projections of the base metal favored the highest current densities while low current density areas remained masked by undisturbed portions of the oxide film.

EXAMPLE 5

Figure 6:
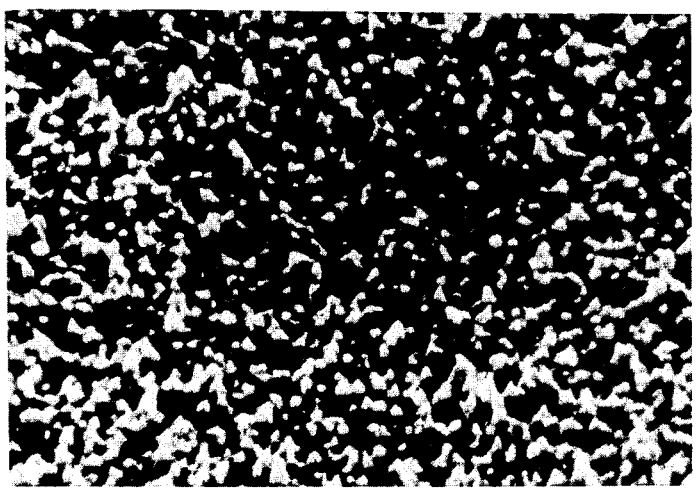
FIG. 6 shows the projections of a nickel coating according to the invention in the condition as electrodeposited on a scale of 1 $\mu$m per centimeter.
Figure 7:
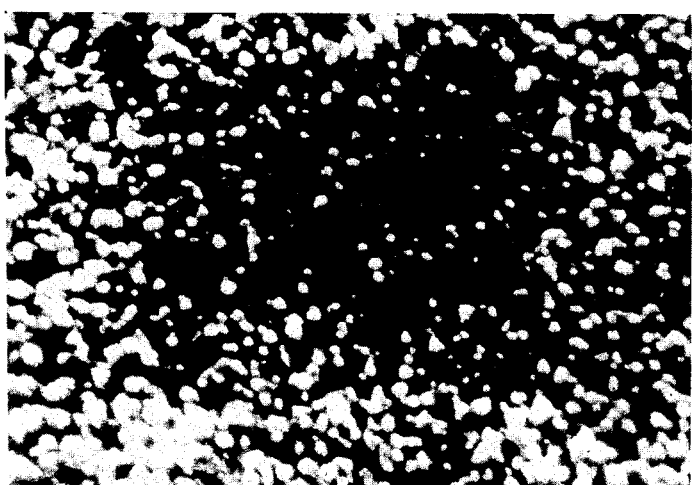
FIG. 7 is a corresponding view of the same coating after heat treatment.

Aluminum oxide powder having an average particle size of 40 nm was dispersed in an amount of 20 g/l in an aqueous electrolyte containing 15 g/l $NiCl_2$, 15 g/l $NH_4Cl$, and 40 g/l NaCl. A suitably prepared steel panel was made the cathode in the electrolyte at 68° C. at an applied potential of 0.6 V which produced a cathode current density of approximately 6 amp./dm$^2$ for 30 minutes. The electrolyte was agitated to keep the alumina dispersed. When withdrawn from the bath, rinsed and dried, the panel appeared brownish to the naked eye and showed closely juxtaposed projections in an electron micrograph (FIG. 6). The coating turned black when heated in the ambient air at 400° C. for several hours. It appeared that the heat treatment consolidated the galvanic deposits which enveloped the alumina grains from all sides and anchored them to the substrate.

The nickel coating enclosing cores of alumina was found to operate satisfactorily over extended periods of time at temperatures in excess of 500° C. in a manner not available from the coatings described in Examples 1 to 4. Equally heat-resistant coatings were produced when the aluminum oxide particles were replaced by particles of $SiO_2$ or $CeO_2$ of similar dimensions.

It is a common feature of the procedures outlined above that they are inexpensive and produce coatings which compare favorably in their high absorbance for total solar radiation and low emittance for thermal radiation with the best coatings available heretofore at costs often too high to permit application in solar heating systems for industrial or domestic purposes. Except as specifically noted, they appear black to the naked eye from whatever angle they are viewed. The coatings of the invention combine favorable radiation characteristics with low material cost and good durability, the nickel and cobalt coatings resisting even the high temperatures required for furnishing steam for turbines. The conductive substrates on which projections of submicron size are formed according to this invention may be selected freely to suit specific conditions. Steel and aluminum have been referred to specifically in the Examples, but copper or other metals may be substituted in an obvious manner. If so desired, plastics or ceramics may also be employed when provided with conductive surface films in a conventional manner, and base metal substrates may benefit from protective coatings of zinc, nickel and/or chromium as is partly illustrated by Examples 1 and 3.

The manner in which the panels of this invention are combined with other structure to convert solar energy to steam and the like is too well known to require specific description and has been discussed in more detail in our earlier application.

It should be understood, of course, that the foregoing disclosure relates only to presently preferred embodiments, and that it is intended to cover all modifications and variations of the examples of the invention herein chosen for the purpose of the disclosure which do not depart from the spirit and scope of the invention set forth in the appended claims.

What is claimed is:

1. A panel capable of absorbing incident solar radiation at a high rate and of emitting only a small portion of the absorbed energy as thermal radiation, said panel comprising:
   (a) a substrate formed of a metallic layer of electrically conductive material; and
   (b) a multiplicity of projections electrochemically deposited on firmly secured to and substantially completely covering a face of said substrate and extending outwardly away from said face to respective peaks thereof spaced laterally apart;
      (1) the average peak-to-peak spacing of said projections in a direction parallel to said face being between 0.1 to 1 $\mu$m, and
      (2) the surface portions of said projections consisting essentially of metal.

2. A panel as set forth in claim 1, wherein said metal consists of at least one member of the group consisting of silver, antimony, zinc, lead, cadmium, bismuth, tin, nickel, cobalt, and iron.

3. A panel as set forth in claim 2, wherein said substrate includes a layer of metal consisting of at least one member of the group consisting of steel, aluminum, and copper.

4. A panel as set forth in claim 3, wherein said substrate includes a coating of metal consisting of at least one member of the group consisting of zinc, nickel, and chromium and said coating covering said layer and constituting said face.

5. A panel as set forth in claim 1, wherein at least a major portion of said projections contains a core of a material different from the metal of the surface portion thereof, said core being separated from said substrate by said metal.

6. A panel as set forth in claim 5, wherein the particle size of each of said cores is between 10 and 100 nm.

7. A panel as set forth in claim 6, wherein each of said cores consists of a refraction material consisting of a single grain of one of the groups consisting of aluminum oxide, silicon oxide, and cerium oxide.

8. A panel as set forth in claim 1, wherein at least 90% of said peak-to-peak spacings is smaller than 2 $\mu$m.

9. A panel as set forth in claim 1, wherein said metal consists of at least one member of the group consisting of nickel, cobalt and silver.

10. A panel as set forth in claim 1, wherein said metal is nickel.

* * * * *